UNITED STATES PATENT OFFICE.

JAMES VALENTINE, OF WOODBRIDGE, NEW JERSEY.

IMPROVED SCOURING-BRICK.

Specification forming part of Letters Patent No. 50,862, dated November 7, 1865.

*To all whom it may concern:*

Be it known that I, JAMES VALENTINE, of Woodbridge, in the county and of Middlesex and State of New Jersey, have invented a new and Improved Scouring-Brick for Cleaning Knives and other Articles; and I do hereby declare that the following is a full, clear, and exact description of the same.

Several attempts have been made to manufacture scouring-bricks in this country, but owing to the failure of the manufacturers to obtain the proper kind of clay or earth, or to some other cause, the manufacture has been abandoned and the Bath brick continues to be imported in large quantities.

I have discovered in this country, at Woodbridge, New Jersey, in large quantities, a pulverulent mineral of which a scouring-brick in all respects equal, and in some respects superior, to the imported Bath brick can be made at a greatly reduced cost. The analysis of this mineral from one hundred parts, deprived of its hygrometric moisture, is as follows:

| | |
|---|---|
| Silica (quartz in fine grains) | 88.90 |
| Alumina | 6.35 |
| Sulphate of iron | .20 |
| Sulphuret of iron | trace |
| Sulphate of alumina | .23 |
| Sulphate of magnesia | .43 |
| Sulphate of lime | .10 |
| Chloride of sodium | trace |
| Vegetable organic matter | 2.98 |
| Water and loss | .57 |
| Oxide of iron | .24 |
| | 100.00 |

This mineral, for which I have thought proper to use as a distinctive designation that of "Woodbridge silex," may be taken in a suitably moist condition, and manufactured into bricks in suitable molds and afterward burned in about the same degree as fire-bricks commonly are. After having been burned the bricks may be used in the same manner as the well-known Bath brick.

The superior scouring quality of the Woodbridge silex seems to depend upon the minute mechanical division of its silicious atoms.

For scouring knives and other artices of steel, I do not think the Woodbridge silex can be improved by the addition of any other matter, but for scouring tinware its polishing quality is improved by the addition of from ten (10) to fifty (50) per cent. of kaolin before manufacturing it into bricks.

What I claim as my invention, and desire to secure by Letters Patent, is—

A scouring-brick composed wholly or in part of the pulverulent mineral which I have herein described as "Woodbridge Silex".

JAMES VALENTINE.

Witnesses:
   M. D. VALENTINE,
   HENRY T. BROWN.